US012118982B2

(12) United States Patent
Agarwal et al.

(10) Patent No.: US 12,118,982 B2
(45) Date of Patent: Oct. 15, 2024

(54) SYSTEM AND METHOD FOR CONSTRAINING AIR TRAFFIC COMMUNICATION (ATC) TRANSCRIPTION IN REAL-TIME

(71) Applicant: HONEYWELL INTERNATIONAL INC., Charlotte, NC (US)

(72) Inventors: Jitender Agarwal, Bangalore (IN); Mohan M Thippeswamy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 270 days.

(21) Appl. No.: 17/664,756

(22) Filed: May 24, 2022

(65) Prior Publication Data
US 2023/0326449 A1 Oct. 12, 2023

(30) Foreign Application Priority Data

Apr. 11, 2022 (IN) .............................. 202211021488

(51) Int. Cl.
*G10L 15/02* (2006.01)
*G06F 40/242* (2020.01)
(Continued)

(52) U.S. Cl.
CPC ............ *G10L 15/02* (2013.01); *G06F 40/279* (2020.01); *G10L 15/26* (2013.01); *G06F 40/242* (2020.01); *G08G 5/00* (2013.01)

(58) Field of Classification Search
CPC ....... G10L 15/02; G10L 15/26; G10L 15/193; G10L 15/32; G10L 15/22; G10L 15/1815;
(Continued)

(56) References Cited

U.S. PATENT DOCUMENTS 5,333,275 A * 7/1994 Wheatley ................ G10L 15/18
704/231
6,463,413 B1 10/2002 Applebaum et al.
(Continued)

FOREIGN PATENT DOCUMENTS

CN 111785257 A 10/2020
CN 112954122 A 6/2021
(Continued)

OTHER PUBLICATIONS

Furui Sadaoki; "Recent advances in robust speech recognition" Assistant-based speech recognition from ATM applications. Apr. 17, 1997 pp. 11-20 Section 4.1 XP093050804. Retrieved from the Internet: URL:https//www.isca-speech.org/archive_open_archive_papers/rsr_97/rsr7_011.pdf.

(Continued)

*Primary Examiner* — Leshui Zhang
(74) *Attorney, Agent, or Firm* — Lorenz & Kopf LLP

(57) ABSTRACT

Systems and methods are provided for the selection of a speech model for automatic speech recognition during the runtime of a transcription system, the system includes an event detector to determine one of a number of flight events that include flight plan changes and phase transitions based on data received from a set of inputs; an intelligent keyword generator to collate a set of keywords associated with the flight plan information and to generate a wordlist in response to a determination by the event detector of flight plan changes or flight phase transitions; and a processor to determine whether the wordlist is covered by a current speech model implemented in the automatic speech recognition wherein if the wordlist is not covered by the current speech model, then the processor to select a pre-built speech model that covers the wordlist for use as the current speech model in the automatic speech recognition.

20 Claims, 5 Drawing Sheets

(51) Int. Cl.
*G06F 40/279* (2020.01)
*G08G 5/00* (2006.01)
*G10L 15/26* (2006.01)

(58) Field of Classification Search
CPC .............. G10L 15/1822; G10L 15/08; G10L
2015/228; G06F 40/279; G06F 40/242;
G06F 40/35; G08G 5/0013; G08G
5/0021; G08G 5/00; G08G 5/0039; G08G
5/0034; G08G 5/0008; G08G 5/0091;
G08G 5/0026; G08G 5/0043; G08G
5/0052; G08G 5/003; G01C 23/00; G01C
23/005; B64D 45/00; B64D 43/00; B64C
13/18; B64C 39/024
USPC ................................ 704/200, 231, 246, 9
See application file for complete search history.

(56) References Cited

U.S. PATENT DOCUMENTS

| | | | |
|---|---|---|---|
| 8,249,870 B2 | 8/2012 | Roy et al. | |
| 8,306,675 B2 | 11/2012 | Prus et al. | |
| 8,626,498 B2 | 1/2014 | Lee | |
| 9,355,094 B2* | 5/2016 | Cuthbert | G06F 3/167 |
| 9,368,108 B2 | 6/2016 | Liu et al. | |
| 9,786,283 B2 | 10/2017 | Baker | |
| 10,152,968 B1 | 12/2018 | Agrusa et al. | |
| 10,403,274 B2 | 9/2019 | Girod et al. | |
| 10,573,304 B2 | 2/2020 | Gemmeke et al. | |
| 10,629,186 B1 | 4/2020 | Slifka | |
| 10,878,807 B2 | 12/2020 | Tomar et al. | |
| 2005/0165602 A1 | 7/2005 | Cote et al. | |
| 2013/0197917 A1* | 8/2013 | Dong | G10L 15/183 |
| | | | 704/275 |
| 2015/0217870 A1* | 8/2015 | McCullough | G10L 15/22 |
| | | | 704/275 |
| 2016/0379640 A1 | 12/2016 | Joshi et al. | |
| 2018/0047387 A1 | 2/2018 | Nir | |
| 2018/0129635 A1 | 5/2018 | Saptharishi et al. | |
| 2018/0182386 A1* | 6/2018 | Lee | G10L 15/22 |
| 2019/0147858 A1* | 5/2019 | Letsu-Dake | G10L 15/063 |
| | | | 704/275 |
| 2020/0027457 A1 | 1/2020 | Gelinske et al. | |
| 2020/0075044 A1 | 3/2020 | Jankowski, Jr. et al. | |
| 2020/0171671 A1 | 6/2020 | Huang et al. | |
| 2021/0020168 A1* | 1/2021 | Dame | G08G 5/0013 |
| 2021/0074277 A1* | 3/2021 | Lewis | G10L 15/22 |
| 2021/0225371 A1 | 7/2021 | Takacs et al. | |
| 2021/0233411 A1* | 7/2021 | Saptharishi | G10L 15/26 |
| 2022/0115019 A1 | 4/2022 | Bradley et al. | |
| 2022/0115020 A1 | 4/2022 | Bradley et al. | |
| 2022/0238118 A1 | 7/2022 | Mazzoccoli | |

FOREIGN PATENT DOCUMENTS

| | | |
|---|---|---|
| EP | 2669889 A2 | 12/2013 |
| EP | 4095853 A1 | 11/2022 |
| WO | 2009104332 A1 | 8/2009 |

OTHER PUBLICATIONS

Park, Tae Jin, et al.: "A review of speaker diarization: Recent advances with deep learning", arXiv article, Jan. 24, 2021 (Jan. 24, 2021), XP055935769, DOI: 10.1016/j.csl.2021.101317 Retrieved from the Internet: URL:https://arxiv.org/pdf/2101.09624v1.pdf [retrieved on Jun. 27, 2022].

Nikolaos Flemotomos, et al.: "Linguistically Aided Speaker Diarization Using Speaker Role Information", Arxiv. Org, Cornell University Library, 201 Olin Library Cornell University Ithaca, Ny 14853, Nov. 18, 2019 (2019-11-18), XP081593342.

* cited by examiner

SYSTEM AND METHOD FOR CONSTRAINING AIR TRAFFIC COMMUNICATION (ATC) TRANSCRIPTION IN REAL-TIME

CROSS-REFERENCE TO RELATED APPLICATION

This application claims priority to India Provisional Patent Application No. 202211021488, filed Apr. 11, 2022, the entire content of which is incorporated by reference herein.

TECHNICAL FIELD

The subject matter described herein relates generally to vehicle systems, and more particularly, embodiments of the subject matter relate to avionics systems and methods to constrain a model for Automatic Speech Recognition (ASR) used in transcribing cockpit communications in real-time.

BACKGROUND

Even though datalink technologies are employed in in-flight communications, a majority of communications between an Air Traffic Controller (ATC) and a pilot is through speech using cockpit radio channels. Speech recognition applications are used in aircraft systems for transcription of ATC-pilot communications as well as for providing other commands, control, and automatic terminal information service (ATIS) information.

The ATC transcription to transcribe cockpit communications for the required high accuracy is data-intensive requiring a lot of keywords stored to perform accurate transcription in the aviation domain. This is because, in the aviation domain, there are a host of unique keywords and acronyms that require storage for purposes of recognition while executing an Automatic Speech Recognition (ASR) model. Such acronyms and keywords may include airport names, Navigation Aid Systems (NAVAIDs), procedure names, Standard Instrument Departure Routes, and Standard Arrival Routes (SID/STARs), or route-specific keywords such as airways, fixes, airspace, waypoints, Non-Directional Beacon (NDB)/Very High-Frequency Omni-Directional Range (VOR)/Terminal Radar Approach Control Facilities (TRACON)/Very High-Frequency Omni-Directional Radio Range Tactical Air Navigation Aid (VORTAC), Visual Flight Rule (VFR) point, USER waypoints, call signs, and taxiways that are unique to the aviation domain. The requirement of having amounts of unique keyword terminology stored for accuracy in transcription causes increases in memory usage and latency when executing an ASR model by a transcription system.

It is desirable to overcome the drawbacks posed by the requirements of having larger memories and latencies caused by voluminous amounts of unique keywords in the ASR model and to enable an ATC transcription application that is configured to be executed locally in a cockpit environment with virtually no or limited external cloud support.

It is desirable for the ASR model to be executable on an edge device by adding a set of constraints on the compute platform when implementing the ASR model as with an edge-based solution there are little or limited computation capabilities and limited memory available.

It is desirable to enable an ASR model and language processing system in an aviation domain that at least overcomes the drawbacks caused by requirements of terminologies of voluminous non-standard English keywords like waypoints, fixes, navaids, custom fixes, and cryptic/unusual pronunciation with variations that may impact the accuracy of the ASR model in usage.

It is desirable to provide methods and systems that realize improvements in ASR model performance of accuracy and latency by constraints in the ASR model size that include constraints to speech models which are optimized to perform better for recognition accuracy and latency.

It is desirable to limit the usage of storing large vocabularies that result in increases in the search paths causing inferencing as well as adding memory requirements for loading and causing increasing time for textual inference.

It is desirable to balance the requirements of storing unique words for accuracy with the detrimental effects of storing and parsing too many unique words that can be detrimental to speech recognition accuracy.

It is desirable to provide methods and systems to dynamically detect an event that aids in switching or generation of constrained models including all required keywords in each flight stage to improve speech recognition performance.

Other desirable features and characteristics of the methods and systems will become apparent from the subsequent detailed description and the appended claims, taken in conjunction with the accompanying drawings and the preceding background.

BRIEF SUMMARY

Aircraft systems and related operating methods are provided. In one embodiment, a transcription system with a selectable speech model used in automatic speech recognition is provided. The system includes an event detector configured to determine one of a number of flight events that comprise flight plan changes and a flight phase transition based on event data received from a set of inputs; an intelligent keyword generator in operable communication with the event detector and configured to collate a set of keywords associated with at least flight plan information to generate a wordlist in response to a determination by the event detector of the flight plan changes or the flight phase transition wherein the wordlist contains keywords associated with the flight plan changes and the flight phase transition; and a processor in operable communication with the intelligent keyword generator and configured to determine, based on the wordlist from intelligent keyword generator, whether the wordlist is covered by a current speech model implemented in the automatic speech recognition of the transcription system, wherein if the wordlist is not covered by the current speech model, then the processor is further configured to communicate with a database storing one or more pre-built speech models to select a pre-built speech model that covers the wordlist for use as the current speech model in the automatic speech recognition of the transcription system.

In at least one exemplary embodiment, the transcription system further includes if the pre-built speech model is not available that covers the wordlist from the intelligent keyword generator, then the processor is further configured to generate a new speech model for use as the current speech model with the automatic speech recognition of the transcription system to enable coverage of the wordlist by the current speech model and constraint of the current speech model to at least the flight plan changes or the flight phase transition.

In at least one exemplary embodiment, the processor is further configured to: determine the coverage of the wordlist from the intelligent keyword generator by comparison of the keywords in the wordlist contained in each of the one or more pre-built speech models stored in the database.

In at least one exemplary embodiment, the intelligent keyword generator is further configured to: collate the keywords used in communication in the flight plan changes or the flight phase transition for comparison of keyword coverage in each of the one or more pre-built speech models stored in the database.

In at least one exemplary embodiment, the event detector is further configured to receive the event data from the set of inputs, wherein the set of inputs comprises a first input of pilot input, the second input of data input from one or more aircraft systems that include Flight Management System (FMS) data, the third input of Air Traffic Control (ATC) clearance data, and the fourth input of log data generated by one or more checklists or pilot logs.

In at least one exemplary embodiment, the set of inputs is configured in a hierarchy by the processor to determine a flight phase change or flight phase transition with the pilot input given the highest value.

In at least one exemplary embodiment, the processor is further configured to: implement a plurality of checks to determine whether data from the first, second, third, or fourth input triggers the determination by the event detector of the flight plan change or the flight transition for re-selecting of the current speech model in use by the transcription system.

In another exemplary embodiment, a method of implementing automatic speech recognition during the runtime of a transcription system is provided. The method includes determining, by an event detector, one of a number of flight events that comprise flight plan changes and a flight phase transition based on event data received from a set of inputs; collating, by an intelligent keyword generator, a set of keywords associated with at least flight plan information for generating a wordlist in accordance with the flight plan changes or the flight phase transition determined by the event detector, wherein the wordlist contains keywords associated the flight plan changes and the flight phase transition; determining, by a processor based on the wordlist from the intelligent keyword generator, whether the wordlist is covered by a current speech model implemented in automatic speech recognition of the transcription system; and in response to a determination that the wordlist is not covered by the current speech model, selecting, by the processor by communicating with a database storing one or more pre-built speech models, the pre-built speech model covering the wordlist.

In at least one exemplary embodiment, the method includes in response to the determination that the pre-built speech model covering the wordlist from the intelligent keyword generator is not available, generating by the processor, a new speech model for use as the current speech model for the automatic speech recognition of the transcription system for enabling coverage of the wordlist by the current speech model and for constraining the current speech model to at least the flight plan changes or the flight phase transition.

In at least one exemplary embodiment, the method includes determining coverage, by the processor, of the wordlist from the intelligent keyword generator by comparison of the wordlist to the keywords contained in each of the one or more pre-built speech models stored in the database.

In at least one exemplary embodiment, the method includes collating, by the processor, keywords of the wordlist used in communication in the flight plan changes or the flight phase transition for comparison of keyword coverage in each of the one or more pre-built speech models stored in the database.

In at least one exemplary embodiment, the method includes receiving, by the event detector, the event data from the set of inputs comprising a first input of pilot input, the second input of data input from one or more aircraft systems that include Flight Management System (FMS) data, the third input of Air Traffic Control (ATC) clearance data, and the fourth input of log data generated by one or more checklists or pilot logs.

In at least one exemplary embodiment, the method includes configuring, by the processor, a hierarchy for determining a flight phase change or flight phase transition with the pilot input given the highest value.

In at least one exemplary embodiment, the method includes implementing, by the processor, a plurality of checks for determining whether data from the first, second, third, or fourth input triggers the determination by the event detector of the flight plan change or the flight transition for re-selecting of the current speech model in use by the transcription system.

In yet another exemplary embodiment, at least one non-transient computer-readable medium having instructions stored thereon that are configurable to cause at least one processor to perform a method for selection of a speech model in automatic speech recognition during runtime of a transcription system is provided. The method includes determining, by the at least one processor, one of a number of flight events comprising flight plan changes and a flight phase transition based on event data received from a set of inputs; collating, by the at least one processor, a set of keywords associated with at least flight plan information for generating a wordlist in accordance with flight plan changes or the flight phase transition determined by the event detector, wherein the wordlist contains keywords associated the flight plan changes and the flight phase transition; determining, by the at least one processor based on the wordlist from the intelligent keyword generator, whether the wordlist is covered by a current speech model implemented in the automatic speech recognition of the transcription system; and in response to a determination that the wordlist is not covered by the current speech model, selecting, by the at least one processor by communication with a database storing one or more pre-built speech models, a pre-built speech model covering the wordlist.

In at least one exemplary embodiment, the method includes in response to the determination that the pre-built speech model covering the wordlist is not available, generating by at least one processor, a new speech model for use as the current speech model for the automatic speech recognition of the transcription system for enabling coverage of the wordlist by the current speech model and for constraining the current speech model to at least the flight plan changes or the flight phase transition.

In at least one exemplary embodiment, the method includes determining coverage, by at least one processor, of the wordlist by comparison of the wordlist to the keywords contained in each of the one or more pre-built speech models stored in the database.

In at least one exemplary embodiment, the method includes collating, by at least one processor, keywords of the wordlist used in communication in the flight plan changes or the flight phase transition for comparison of keyword coverage in each of the one or more pre-built speech models stored in the database.

In at least one exemplary embodiment, the method includes receiving, by at least one processor, the event data from the set of inputs comprising a first input of pilot input, the second input of data input from one or more aircraft systems that include Flight Management System (FMS) data, the third input of Air Traffic Control (ATC) clearance data, and the fourth input of log data generated by one or more checklists or pilot logs.

In at least one exemplary embodiment, the method includes implementing, by at least one processor, a plurality of checks for determining whether data from the first, second, third, or fourth input triggers the determination by the event detector of the flight plan change or the flight transition for re-selecting of the current speech model in use by the transcription system.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
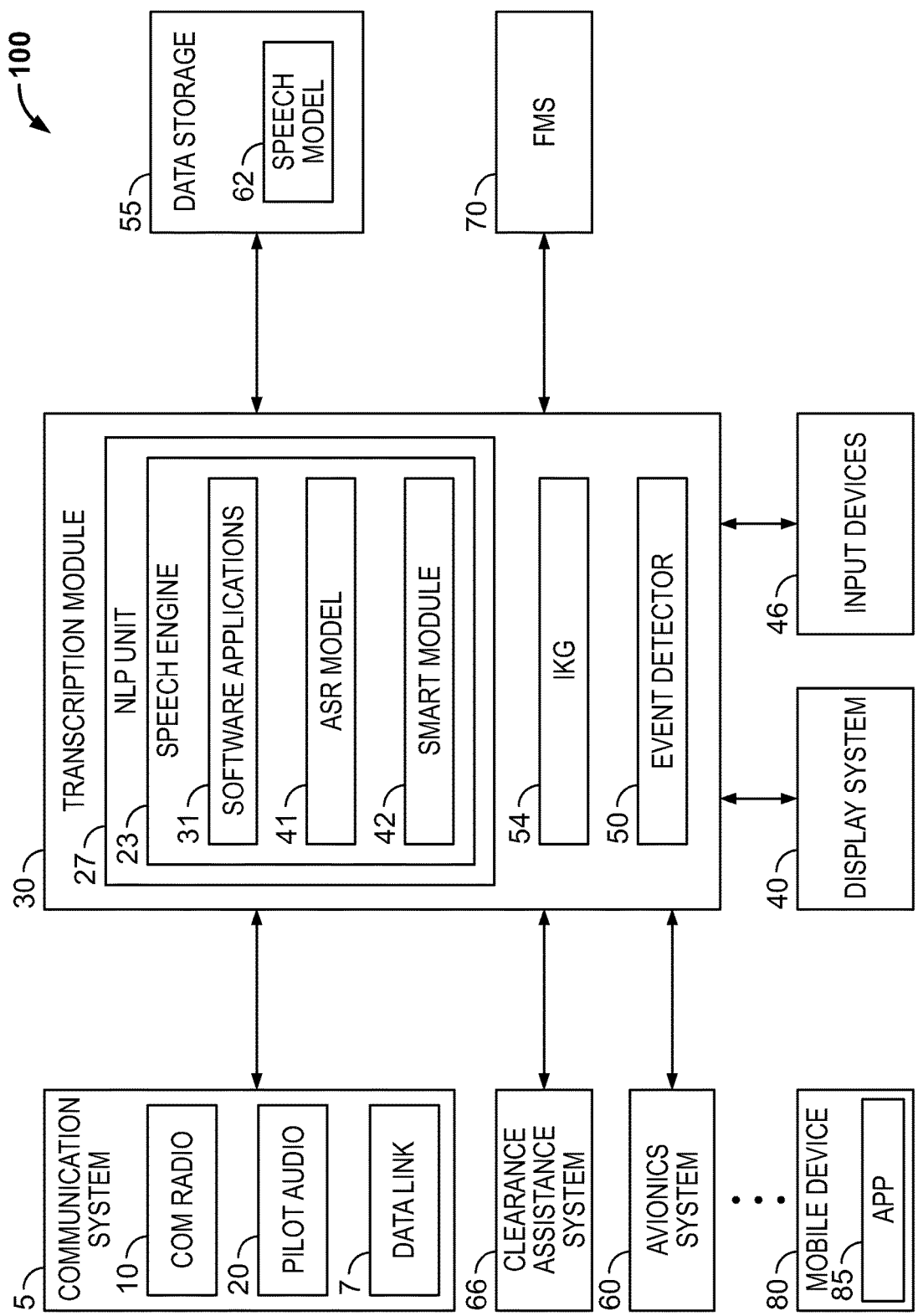
FIG. 1 depicts an exemplary embodiment of a processing system to select a speech model based on event detection of a transcription system which may be utilized with a vehicle, such as an aircraft in accordance with an embodiment.

The following detailed description is merely exemplary in nature and is not intended to limit the subject matter of the application and uses thereof. Furthermore, there is no intention to be bound by any theory presented in the preceding background, brief summary, or the following detailed description.

The Air Traffic Controller (ATC) is typically involved with voice communications between a pilot or crewmember onboard the various aircraft within controlled airspace. The ATC and the pilot are often in constant communication over a Voice Channel or the CPDLC throughout the flight. The ground-to-air communications include clearance, information, or requests for message elements. The ATC to pilot communications have several limitations including but not restricted to miscommunication, transmission errors, misinterpreted voice instructions, ambiguous communications, non-standard phraseology that can cause an increased pilot overload of operational tasks when listening to ATC amidst flying the aircraft.

In in-flight operations, there exists a large number of terminology associated with different arrival procedures, approaches, and departure procedures. The ATC-pilot communication in a customary dialog will contain a general class of keywords that includes call sign specific keywords that allow both parties in the communication dialog to know or identify the flight to prevent or at least limit confusion with respect to flight specific instructions. In embodiments, the ATC-pilot communication may include a realm of different types of messages that include a clearance instruction, an advisory message, or query (question) issued by the controller to the pilot as well as readback requests, reports, or queries issued by the pilot to the controller. In either case, there may be specific keywords used in the respective flight phase transition and flight phase that increase (or contribute) to the vocabulary keyword list (or keyword corpus) of a speech model that is used for transcription of a dialog exchange.

In embodiments, to enhance the speech model, it is desirable to implement the usage of a keyword list with unique keywords that are dependent on the flight phase or transition in the flight phase which can be used also as a basis to necessitate changes in a vocabulary set or keyword list of unique keywords contained in a current ASR model in usage. In this case, the current ASR model with a configured keyword list enables increases in accuracy of transcription of the voiced communications in the respective flight phase transition or flight phase.

In various exemplary embodiments, the present disclosure describes methods and systems that automatically provide a display of the extracted text of clearance or communication of the flight phase or transition to the pilot or other flight personnel for review and to prevent miscommunications in ATC instructions and other flight operations.

In various exemplary embodiments, methods and systems described are associated with a voice-activated flight deck that enables speech recognition or brings a speech recognition system into the cockpit.

In various exemplary embodiments, the methods and systems provide capabilities associated with command and control and transcribing of ATC conversations. In various exemplary embodiments, the present disclosure describes methods and systems that reduce the pilot's workload by improving a current ASR model by the selection of the ASR model in use based on runtime inputs and at least changes in the flight plan. In embodiments, the ASR models are configured (or constrained) with unique keywords used in the speech models for transcriptions based on inputs from users, ATC communications, and changes in the flight phase.

In various exemplary embodiments, the present disclosure describes methods and systems that reduce frequency congestion experienced by reducing the need between the pilot and ATC to make repeated requests for clearance communications based on improvements of ASR models by keyword data associated with a flight phase. Other residual benefits to existing and planned cockpit functionality may include enhancements to playback of radio communications and real-time transcription of radio communications which are more contextual and intelligent.

For purposes of explanation, the subject matter is primarily described herein in the context of aircraft operating in controlled airspace; however, the subject matter described herein is not necessarily limited to aircraft or avionic environments, and in alternative embodiments, may be implemented equivalently for ground operations, marine operations, or otherwise in the context of other types of vehicles and travel spaces.

FIG. 1 depicts an exemplary embodiment of a transcription processing system 100 operating during the runtime of a transcription system which may be utilized with a vehicle, such as an aircraft in accordance with an embodiment. FIG. 1 in an exemplary embodiment, shows a transcription processing system 100 includes, without limitation, a display system 40, one or more user input devices (user input 46), communication systems 5, a clearance assistance system 66, a flight management system (FMS) 70, one or more avionic systems 60, and a data storage 50 suitably configured to support the operation of multiple sets of speech models (speech model 62), as described in greater detail below.

In an embodiment, as shown in FIG. 1, a clearance instruction or clearance command may be received from the Air Traffic Control (ATC) via the communication system 5 of an aircraft that may be configured to include several communication channels or interfaces of a data link 7, a COM radio 10, and pilot audio 20 for sending and receiving commands and instructions in different flight phases or flight transitions.

In an embodiment, in the case of an ATC audio message (e.g., ATC clearance audio message), an aeronautical operational control (AOC) message, and/or a pilot voice audio, the various audio type messages are processed to a transcription system (transcription module 30) for speech-to-text conversion and for displaying the transcribed text on the display device 40 for visual notification to the pilot. The transcription module 30 can be implemented with one or more different ASR models (i.e., speech model 29) for enhanced speech transcription of the performance of the functions associated with speech-to-text conversion. In an implementation, a speech to text converter (speech engine 23) may be used with the transcription module 30 to receive the voice and audio input of the radio communications (from communication systems 5) and may store the transcribed text for display during the runtime of the speech-to-text conversion process.

In exemplary embodiments, with further reference to FIG. 1, the aircraft communication system 5 may receive and send voice communications between the pilot and the controller, other recorded cockpit audio, and data via the data link 7. The output from the communication system 5 is received by the transcription module 30 that may be configured with a speech engine 23 that includes various software applications 31 to enhance the accuracy of speech-to-text extraction and conversion by a natural language processing (NLP) unit 27 of voice conversations that occur between the pilot and the controller during the flight. The NLP unit 27 as described is configured to implement a speech engine 23 that uses a speech model (ASR model) 41 to perform functions such as morphological segmentation, entity recognition, conversion of chunks of text into formal representations, tagging parts of speech, parsing, relationship extraction, and sentiment analysis of audio segment parts of the flight conversations between the pilot and controllers. The flight conversations as an example may include clearance messages that are voiced between the pilot and the controller.

In an exemplary embodiment, the speech engine 23 of the NLP unit 27 is configured with a set of speech analysis applications (various software applications 31) that include an application for spotting keywords and sentence segments in voice conversations; an application that categorizes sentences based on priority; an application to categorize sentence segments from the application, and an application to determine a category of the message captured in the voice conversations and an application to determine the flight context on the captured message.

In exemplary embodiments, an output from the transcription module 30 is received by a clearance assistance system 66, various avionic systems 60, and the flight management system (FMS) 70 of the aircraft. For example, the output from the NLP unit 27, after the speech analysis, is sent to the clearance assistance system 66 so that certain context-based priority tagging operations can be performed based, for example, on the priority of the words, and filtering or segmenting of the words and phrases. Once completed, the output is sent to various cockpit display systems 40 and/or configured as an audio output for communication on the aircraft audio systems to the pilot.

In exemplary embodiments, the speech engine 23 may be configured to include an ASR model 41 that is switched between multiple ASR pre-built models 62 (at data storage 55) based on coverage of unique keywords identified in a keyword list by an intelligent Keyword Generator (iKG) 54. The iKG 54 with a smart module 42 monitors in real-time or near real-time coverage of the unique keywords in-flight phases and identifies all required specific keywords at given times. In an implementation, the smart module 42 can trigger events to generate constrained models dynamically if the prebuilt models that cover the keywords are not found. The constrained model (i.e., the ASR model 41) which is the current ASR model in use will cover all the keywords and unique keywords generated by the iKG 54 in each flight phase and transcribe incoming messages in the particular flight phase or flight transition for better speech recognition performance.

In another embodiment, this feature of selection of a constrained model can be configured in an (ATC transcription) app 85 on a mobile device 80 connected wirelessly with the avionic systems 60 with user input enabled in a settings page or tab of the app 85. The user can view the transcription quality on the display system 40 and if not satisfied can trigger the reconfiguration process of the ASR model 41 (via the app 85) to generate or replace the current speech model using current flight parameters or other user input. Even the event trigger can be enabled or disabled using the configuration page of the app 85. This will enable the user to reconfigure, re-generate or constrain an existing ASR model 41 even when there is no change in a flight phase or transition or event-triggered or detected by the event detector 50.

In embodiments, the parameters configured in the constraint models can be selected in alternative ways such as based on the geographic region. In this case, the geographic region may be separated or divided into multiple zones or segmented by states or cities, other geographical boundaries, accent-based boundaries, and sectors or Air Traffic Control Centers (ARTCC) centers on which a constraint model may be selected. In another embodiment, constraint ASR models (selected from data storage 55) can be constrained or selected based on an inputted flight plan (via input devices 46) or even on a more granular level to a flight phase of the flight plan.

In embodiments, the constraint ASR model can be configured in accordance with various prebuilt models (from data storage 55) that are of a definitive size and are stored with a wordlist including all the keywords that are required to generate the appropriate constraint model for use. In implementations, as an example, the wordlist can be split into two parts of a first list containing generic English keywords used in communication/dialogue, and a second list containing aviation domain-specific keywords.

In embodiments, an event detector 50 is configured to process event data and to trigger the iKG 54 to generate new wordlists based on the event data that is used as a basis to determine changes in flight routes, flight phases, and flight transitions. The event data, as an example, can enable the event detector 50 and/or the smart module 41 to cause the triggering of a wordlist generation by determining deviations of an active primary flight plan, a switch to a secondary, an alternate flight plan, or a new route assignment.

In embodiments, the phase transition may also be provided as input to the ATC transcription app (app 85) by the user. In the case of a manual user entry, the input would be given the highest priority as a final flight phase is determined based on manual user entry.

Figure 2:
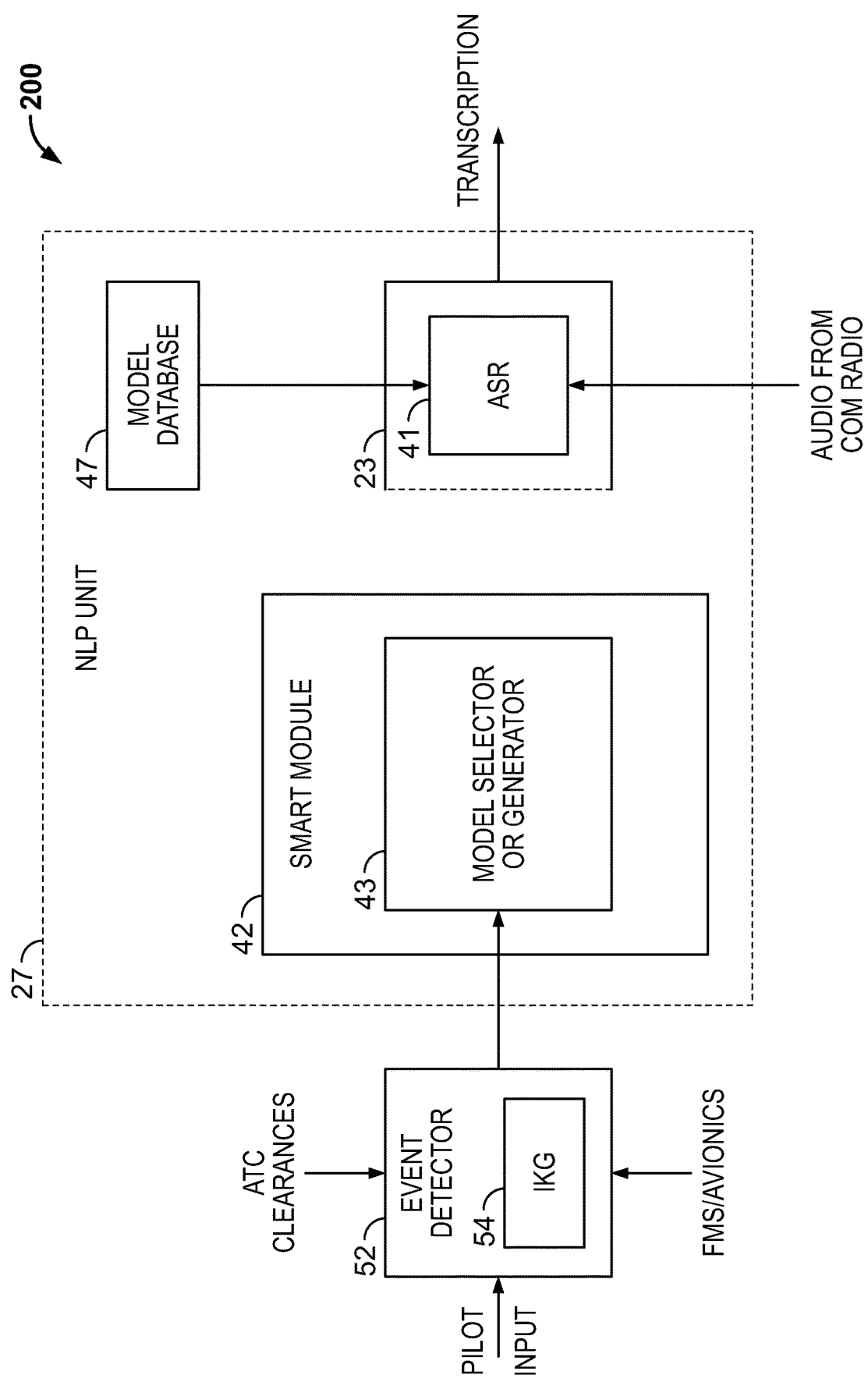
FIG. 2 depicts an exemplary diagram of multiple inputs used in event detection for the selection of a speech model of the transcription system in accordance with an embodiment.

FIG. 2 depicts an exemplary diagram 200 with the event detector 50 and the components of the Natural language processing (NLP) unit 27 of FIG. 1 in accordance with exemplary embodiments. The event detector 50 is combined with the intelligent keyword generator (iKG) 54 where the iKG 54 provides the wordlist for selecting the speech model by the smart model 42 via the model selector or generator 43. The iKG 54 can generate wordlists that include unique words, acronyms, messages, and terminology associated with the detected transition or event change in flight operations. The event detector 50 is configured to detect a multitude of different events that can include complex phase transitions or less complex changes that are used in the basis of selection of the speech model with constraints. The event detector 52 determines the change or transition in the flight plan or other flight event changes that affect the speech model in use by inputs received from the ATC clearance messages, pilot inputs, and inputs from flight management systems and other avionic systems in communication with the event detector 50. In an implementation, the transition or a flight event change may be detected from data from the avionic systems, pilot input, or transcribed and analyzed clearance messages.

In an implementation, a hierarchy can be configured to prioritize applied events. For example, a higher priority may be ascribed to input received by the pilot or other user's manual/voice input to the transcription system.

In an embodiment, the manual user input may be designated with the highest priority as the final flight phase is customarily determined based on the manual (pilot) input of a flight plan received. For example, the event detector 50 may determine the phase of the flight and display the current active phase in the display (i.e., navigation display in the cockpit or display via a user interface of a mobile device) to the user for verification and/or notification. Other implementations include the determination of the phase transition or event based on the data from the FMS, or the FMS (i.e., FMS 70 of FIG. 1) itself determining the phase transition or upcoming event changes and notifying the event detector 50 directly.

This active phase event or phase transition event will be provided to the ATC transcription app (app 85 of FIG. 1) and the iKG 54 if it is connected to a flight deck display or FMS or connected to other avionics subsystems.

In embodiments, the phase transition may be determined through Radiofrequency handover clearances or the type of clearances received by the ATC transcription app. The template or type of clearance for ownship or traffic may also be indicative of the current phase of flight.

In embodiments, the phase transition may be determined by scanning the pilot-filled checklist. As per standard operating procedure, the pilot needs to fill the checklist based on the current phase before the transition to the new phase. This may indicate the current phase if an ATC transcription app is connected to a checklist application or other avionics subsystem that enables the sharing of this event information.

In embodiments, the speech engine may be supported or embedded in a client on a mobile platform such as found in a mobile device like an iPAD® or other tablet or smartphone. In this case, to enable the speech engine 23 (in FIG. 1), the speech model 41 must be configured to execute on a thin or limited local memory and must include all the keywords in the particular flight phase or another flight-related event to enable a sufficient accuracy of transcription in the flight operation. In implementations, the speech model 41 is enabled based on a constraint-sized model in accordance with the flight plan or based on the phase of the flight in the flight plan and can be selectable from a speech model database 47 connected to the smart module 42.

In embodiments, the speech model can be configured with acoustic characteristics which are speech specific including related to the language and/or to the verbiage of the user and speaker; for example, including characteristics related to the pronunciation of the common words and the unique words. The language corpus or vocabulary set can also be trimmed or constrained to particular flight events, phases or transitions so that the acoustic model used in the NPL processing would include all possible or most of the keywords required for the ATC message transcription.

In embodiments, the active phase event or phase transition event is provided to the ATC transcription app (ex. app 85 of FIG. 1) if it is connected to the flight deck display or FMS, or other avionics subsystems. The phase transition can be determined through Radiofrequency handover clearances or the type of clearances received by the ATC transcription app. The template or type of clearance for ownship or traffic is indicative of the current phase of flight. The phase transition can be also determined by scanning a pilot-filled checklist that is received as input to the transcription system. For example, per standard operating procedure, since a pilot is customarily required to fill the checklist based on a respective current phase before the transition to the new phase, the phase transition can be determined based on the checklist status and information included in the current flight phase. The checklist information also may be used as an indicator about the current phase and transition to the next phase when the ATC transcription app is connected to input data from the checklist or other linked avionics subsystems that are configured to share phase and event information.

Figure 3A:
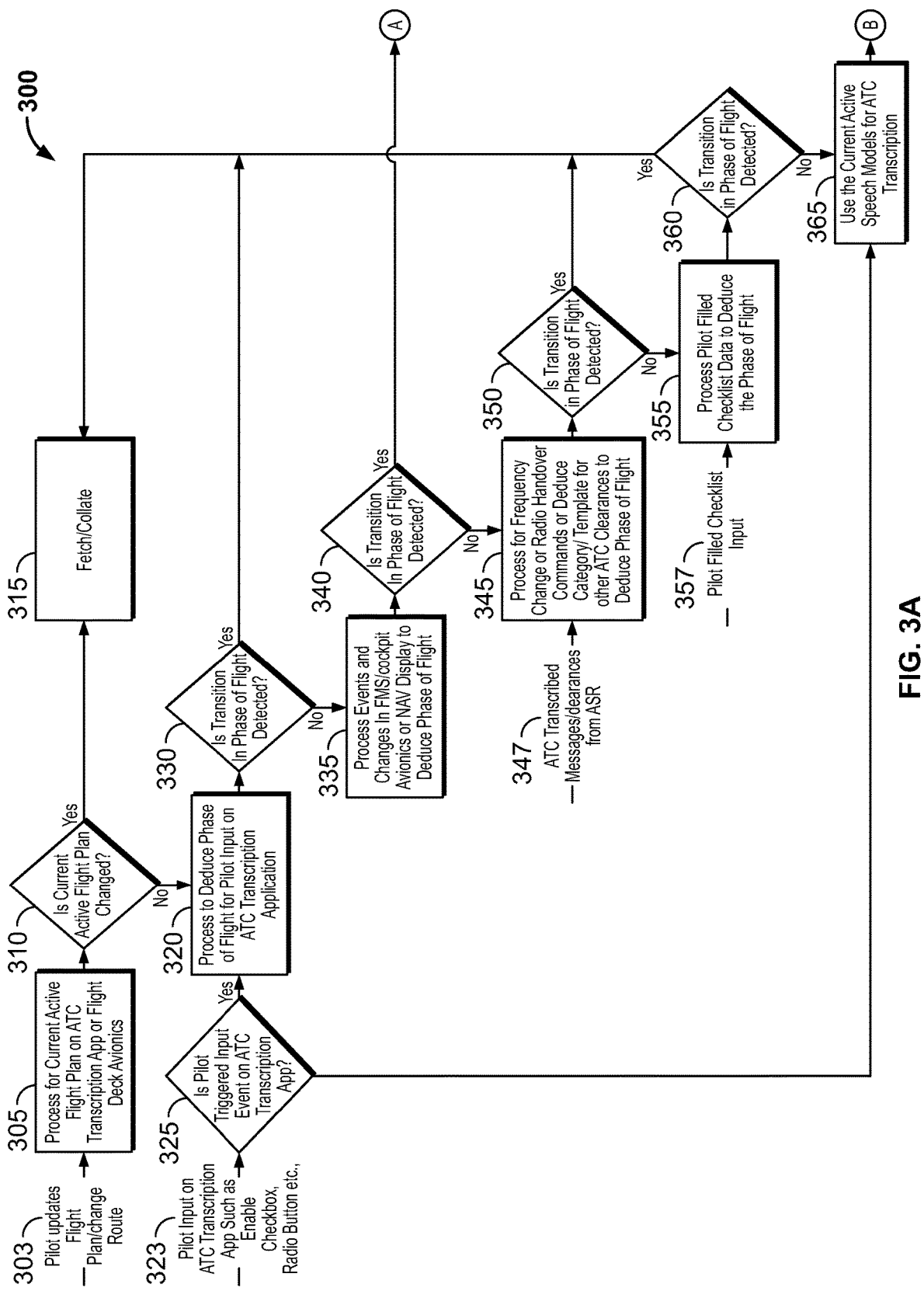
FIGS. 3A and 3B depict exemplary diagrams of the flow process of the speech model selection system based on event detection changes enabling the use of a current speech model with constraints by the transcription system in accordance with an embodiment.
Figure 3B:
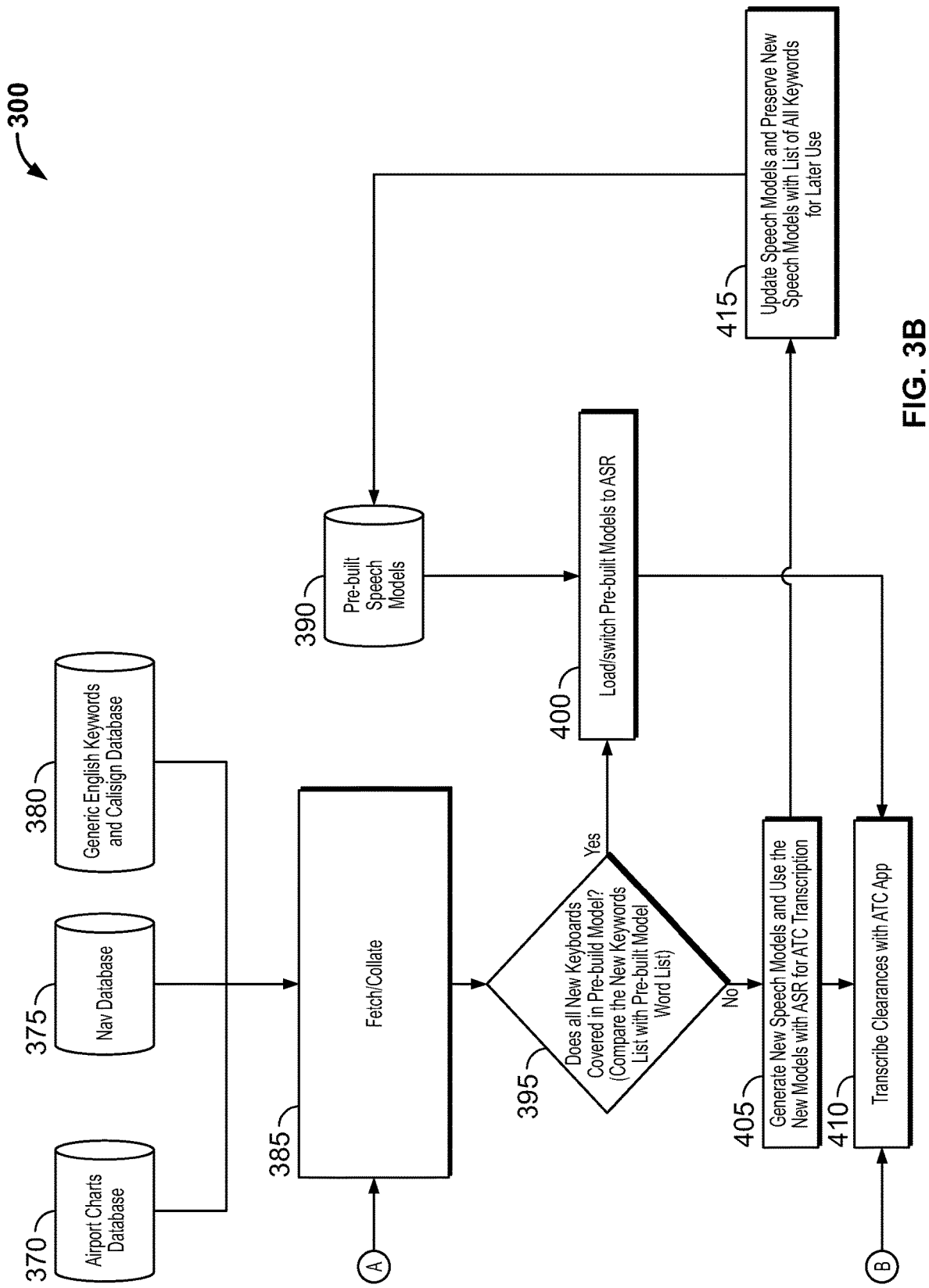

FIGS. 3A and 3B depict exemplary flow diagrams of the transcription process with the event detection and iKG generation of FIGS. 1-2 in accordance with exemplary embodiments. In FIG. 3A, at step 303, input is received of pilot updates and flight plans or changes in flight routes. At step 305, the input is processed for a current active flight plan on the ATC transcription app or by flight deck avionics. In step 310, a determination is made by the event detector of the transcription processing system if the current flight plan has changed. If the flight plan has been changed, then at step 315 the iKG is initiated and is configured to fetch new keywords related to the updated flight plan and new routes. Also, various keywords are collated by the iKG, and the keywords which are collated may be related to the airport, NAVAIDs, procedure names, route-specific keywords such as airways. Alternately, if the current flight plan is determined to have not changed at step 310, then the process flow proceeds to institute a four-step checking process to check data from a set of inputs of the transcription system for flight phase, transition, and event changes. The set of inputs with data checked includes data from a pilot input and clearance messages, event changes, handover commands, and checklists.

In an embodiment, at the first step of the four-step process at step 320, a determination is made of the phase of flight by pilot input data by the ATC transcription system. That is based on input 323 from the pilot, and apps that are configured with enabled checkbox radio buttons to generate input data. In an implementation, at step 325, once a determination is made if a pilot input has triggered the ATC transcription app then at step 320 a determination is made of the flight phase. At step 330 another check is performed of the four-step process of detecting whether a flight transition is occurring. If the flight transition is not detected, then at step 335, data of events and changes in FMS cockpit avionics or display are analyzed to determine the flight phase. The output of this analysis is checked at step 340 of another step of the four-step process, to determine if a transition in the flight phase can be detected. If a flight phase transition is not detected, then at step 345, input from ATC transcribed messages/clearances via input 347 is analyzed and processed for a frequency change, radio handover commands, or determinations of category templates for other ATC clearances for flight phase determinations. At step 350, another check is performed on whether there is a transition in the phase of the flight that can be detected. If there is no detection of the flight phase transition, then the input 357 from the pilot checklist is processed at step 355 which is again checked for a transition at step 360 of a phase change in the flight. If there is no transition detected at this final step, then at step 365, the current speech model is used by the transcription system for the ATC transcription.

If at step 340, after processing the event data and analysis of flight data from aircraft avionic systems, it is determined that there is detected a transition in the flight phase; then the process proceeds to step 385 in FIG. 3B to retrieve new keywords related to the new flight phase. For example, this step may include collating all keywords available for a particular flight transition or flight phase including waypoints and call signs, and other specific keywords at step 385. As an example, the new keywords may be obtained from NAV databases 375, generic English keywords, call-sign databases 380, and airport chart database 370 in communication with the transcription system. At step 395, after the retrieval of the new keywords, a determination is made as to whether the keywords are covered in a pre-build model? This determination is made by a comparison of the new keyword list (list composed of keywords retrieved), and the pre-built models of word lists included in a database of prebuilt speech models 390. If the new keyword list is covered then at step 400 the pre-built model is loaded or switched to the ASR in use. If the new keywords are not covered in any of the pre-built models in the database of prebuilt speed models 390, then a new speech model at step 405 is generated and the new speech model is used at step 410 in transcribing the ATC transcription. Also, the new speech model is added at step 415 to the database of pre-built models 390 for later use, and for updating other speech models if required.

Figure 4:
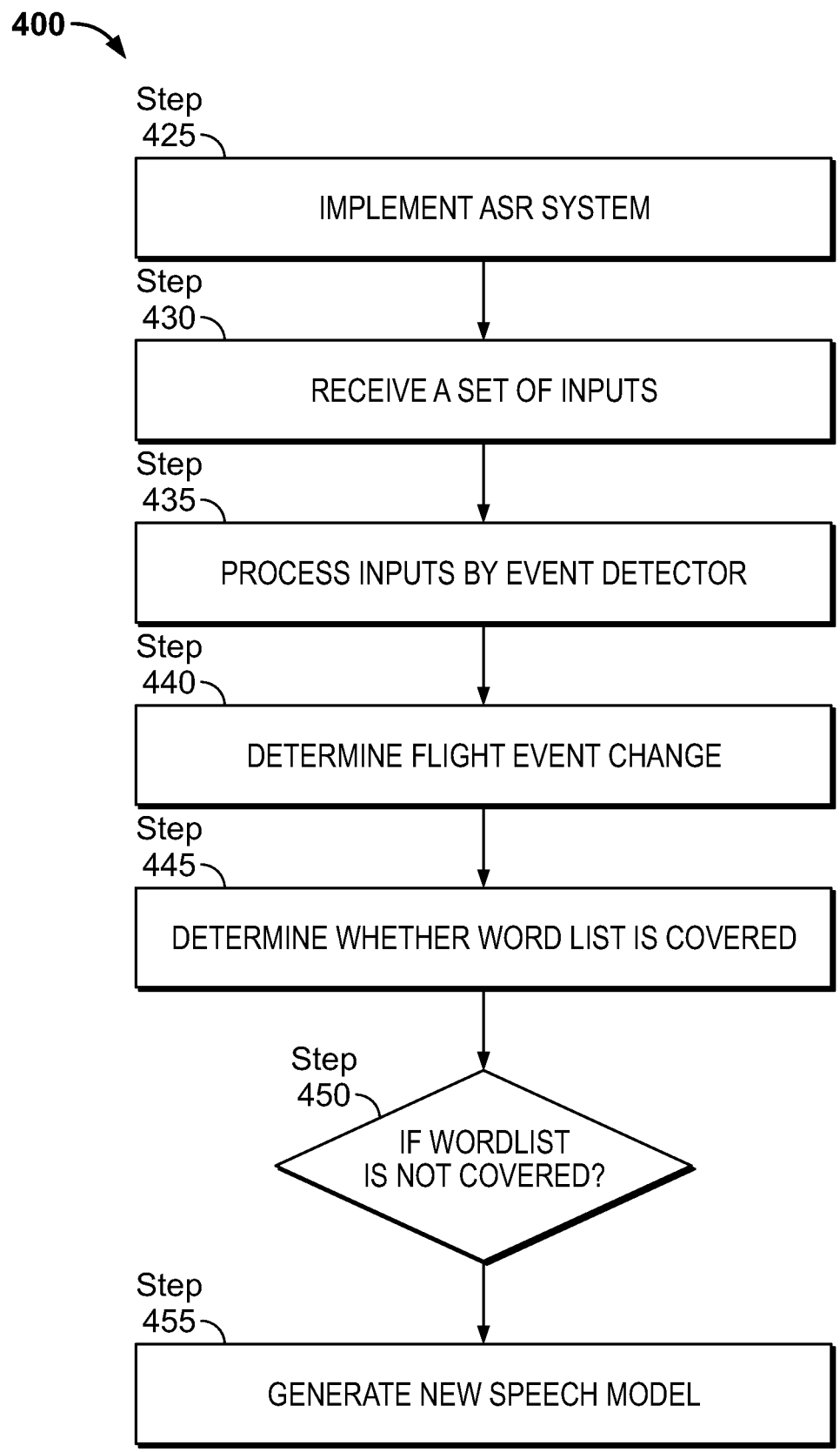
FIG. 4 depicts an exemplary diagram of a flow process of determining coverage of keywords by the ASR model of speech model selection system in accordance with an embodiment.

FIG. 4 is an exemplary flowchart 400 for improving real-time transcription using a selective Automatic Speech Recognition (ASR) model when transcribing pilot-Air Traffic Control (ATC) communications by the cockpit transcription system in accordance with various embodiments. In FIG. 4, at step 425, a method of implementing automatic speech recognition during the runtime of a transcription system is initiated. At step 430, input is received from a set of inputs that include a first input of pilot input, the second input of data input from one or more aircraft systems that include Flight Management System (FMS) data, the third input of Air Traffic Control (ATC) clearance data, and the fourth input of log data generated by one or more checklists or pilot. In an implementation, the set of inputs is configured in a hierarchy with the manual or pilot input given the most value when determining the next step of a change by a flight event. At step 435, the inputs are processed by an event detector to determine one of a number of changes based on a set of flight events that include flight plan changes and a flight phase transition based on event data received from the set of inputs. At step 440, if there is a determined flight event change, then an intelligent keyword generator determines a set of keywords associated with the flight plan information and then generates a wordlist in accordance with the flight plan changes or the flight phase transition determined by the event detector. The keywords in the wordlist are collated by the intelligent keyword generator and then at step 445, a processor is implemented to determine whether the wordlist is covered by a current speech model that is implemented in the automatic speech recognition of the transcription system in use. At step 450, in response to a determination that the wordlist is not covered by the current speech model, the processor communicates with a database storing one or more pre-built speech models and selects a pre-built speech model that covers the wordlist.

At step 455, if there is no pre-built speech model found that covers the wordlist, then the processor generates a new speech model for use as the current speech model for the automatic speech recognition of the transcription system. This new speech model will therefore enable coverage of the wordlist and replace the current speech model in use. The new speech model is constrained to at least the flight plan changes or the flight phase transition.

For the sake of brevity, conventional techniques related to air traffic control, aviation communications, aviation terminology, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. Also, certain terminology may be used in the following description for reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A transcription system with a selectable speech model used in automatic speech recognition comprising:
   an event detector configured to determine one of a number of flight events that comprise flight plan changes and a flight phase transition based on event data received from a set of inputs;
   an intelligent keyword generator in operable communication with the event detector and configured to collate a set of keywords associated with at least flight plan information to generate a wordlist in response to a determination by the event detector of the flight plan changes or the flight phase transition wherein the wordlist contains keywords associated with the flight plan changes and the flight phase transition; and
   a processor in operable communication with the intelligent keyword generator and configured to determine, based on the wordlist from the intelligent keyword generator, whether the wordlist is covered by a current speech model implemented in the automatic speech recognition of the transcription system, wherein if the wordlist is not covered by the current speech model, then the processor is further configured to communicate with a database storing one or more pre-built speech models to select a pre-built speech model that covers the wordlist for use as the current speech model in the automatic speech recognition of the transcription system.

2. The transcription system of claim 1, further comprising:
   if the pre-built speech model is not available that covers the wordlist from the intelligent keyword generator, then the processor is further configured to generate a new speech model for use as the current speech model with the automatic speech recognition of the transcription system to enable coverage of the wordlist by the current speech model and constraint of the current speech model to at least the flight plan changes or the flight phase transition.

3. The transcription system of claim 2, wherein the processor is further configured to:
   determine the coverage of the wordlist from the intelligent keyword generator by comparison of the keywords in the wordlist contained in each of the one or more pre-built speech models stored in the database.

4. The transcription system of claim 3, wherein the intelligent keyword generator is further configured to:
   collate the keywords used in communication in the flight plan changes or the flight phase transition for comparison of keyword coverage in each of the one or more pre-built speech models stored in the database.

5. The transcription system of claim 4, wherein the event detector is further configured to:
   receive the event data from the set of inputs, wherein the set of inputs comprises a first input of pilot input, a second input of data input from one or more aircraft systems that include Flight Management System (FMS) data, a third input of Air Traffic Control (ATC) clearance data, and a fourth input of log data generated by one or more checklists or pilot logs.

6. The system of claim 5, wherein the set of inputs are configured in a hierarchy by the processor to determine a flight phase change or flight phase transition with the pilot input given a highest value.

7. The transcription system of claim 6, wherein the processor is further configured to:
   implement a plurality of checks to determine whether data from the first, second, third, or fourth input triggers the determination by the event detector of the flight plan change or the flight transition for re-selecting of the current speech model in use by the transcription system.

8. A method of implementing automatic speech recognition during runtime of a transcription system, the method comprising:
   determining, by an event detector, one of a number of flight events that comprise flight plan changes and a flight phase transition based on event data received from a set of inputs;
   collating, by an intelligent keyword generator, a set of keywords associated with at least flight plan information for generating a wordlist in accordance with the flight plan changes or the flight phase transition determined by the event detector, wherein the wordlist contains keywords associated with the flight plan changes and the flight phase transition;
   determining, by a processor based on the wordlist from the intelligent keyword generator, whether the wordlist is covered by a current speech model implemented in automatic speech recognition of the transcription system; and
   in response to a determination that the wordlist is not covered by the current speech model, selecting, by the processor by communicating with a database storing one or more pre-built speech models, the pre-built speech model that covers the wordlist.

9. The method of claim 8, further comprising:
   in response to the determination that the pre-built speech model covering the wordlist from the intelligent keyword generator is not available, generating by the processor, a new speech model for use as the current speech model for the automatic speech recognition of the transcription system for enabling coverage of the wordlist by the current speech model and for constraining the current speech model to at least the flight plan changes or the flight phase transition.

10. The method of claim 9, further comprising:
determining coverage, by the processor, of the wordlist from the intelligent keyword generator by comparison of the wordlist to the keywords contained in each of the one or more pre-built speech models stored in the database.

11. The method of claim 10, further comprising:
collating, by the processor, keywords of the wordlist used in communication in the flight plan changes or the flight phase transition for comparison of keyword coverage in each of the one or more pre-built speech models stored in the database.

12. The method of claim 11, further comprising:
receiving, by the event detector, the event data from the set of inputs comprising a first input of pilot input, a second input of data input from one or more aircraft systems that include Flight Management System (FMS) data, a third input of Air Traffic Control (ATC) clearance data, and a fourth input of log data generated by one or more checklists or pilot logs.

13. The method of claim 12, further comprising:
configuring, by the processor, a hierarchy for determining a flight phase change or flight phase transition with the pilot input given a highest value.

14. The method of claim 13, further comprising:
implementing, by the processor, a plurality of checks for determining whether data from the first, second, third, or fourth input triggers the determination by the event detector of the flight plan change or the flight transition for re-selecting of the current speech model in use by the transcription system.

15. At least one non-transient computer-readable medium having instructions stored thereon that are configurable to cause at least one processor to perform a method for selection of a speech model in automatic speech recognition during runtime of a transcription system, the method comprising:
determining, by the at least one processor, one of a number of flight events comprising flight plan changes and a flight phase transition based on event data received from a set of inputs;
collating, by the at least one processor, a set of keywords associated with at least flight plan information for generating a wordlist in accordance with flight plan changes or the flight phase transition determined by the event detector, wherein the wordlist contains keywords associated the flight plan changes and the flight phase transition;
determining, by the at least one processor based on the wordlist from the intelligent keyword generator, whether the wordlist is covered by a current speech model implemented in the automatic speech recognition of the transcription system; and
in response to a determination that the wordlist is not covered by the current speech model, selecting, by the at least one processor by communication with a database storing one or more pre-built speech models, a pre-built speech model covering the wordlist.

16. The method of claim 15, further comprising:
in response to the determination that the pre-built speech model covering the wordlist is not available, generating by the at least one processor, a new speech model for use as the current speech model for the automatic speech recognition of the transcription system for enabling coverage of the wordlist by the current speech model and for constraining the current speech model to at least the flight plan changes or the flight phase transition.

17. The method of claim 16, further comprising:
determining coverage, by the at least one processor, of the wordlist by comparison of the wordlist to the keywords contained in each of the one or more pre-built speech models stored in the database.

18. The method of claim 17, further comprising:
collating, by the at least one processor, keywords of the wordlist used in communication in the flight plan changes or the flight phase transition for comparison of keyword coverage in each of the one or more pre-built speech models stored in the database.

19. The method of claim 18, further comprising:
receiving, by the at least one processor, the event data from the set of inputs comprising a first input of pilot input, a second input of data input from one or more aircraft systems that include Flight Management System (FMS) data, a third input of Air Traffic Control (ATC) clearance data, and a fourth input of log data generated by one or more checklists or pilot logs.

20. The method of claim 19, further comprising:
implementing, by the at least one processor, a plurality of checks for determining whether data from the first, second, third, or fourth input triggers the determination by the event detector of the flight plan change or the flight transition for re-selecting of the current speech model in use by the transcription system.

* * * * *